June 25, 1968  J. BURKART  3,389,767
FLUID COUPLING
Filed Dec. 15, 1966  2 Sheets-Sheet 1
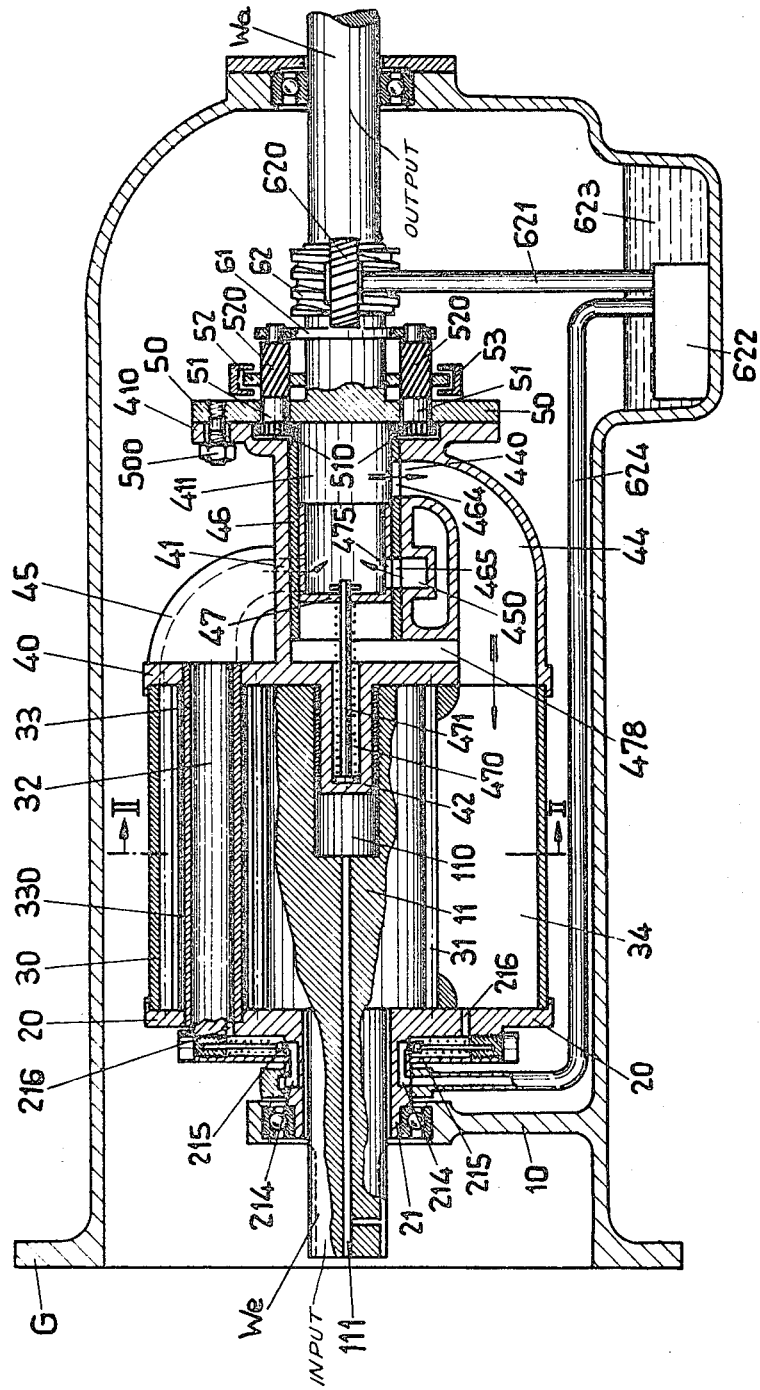

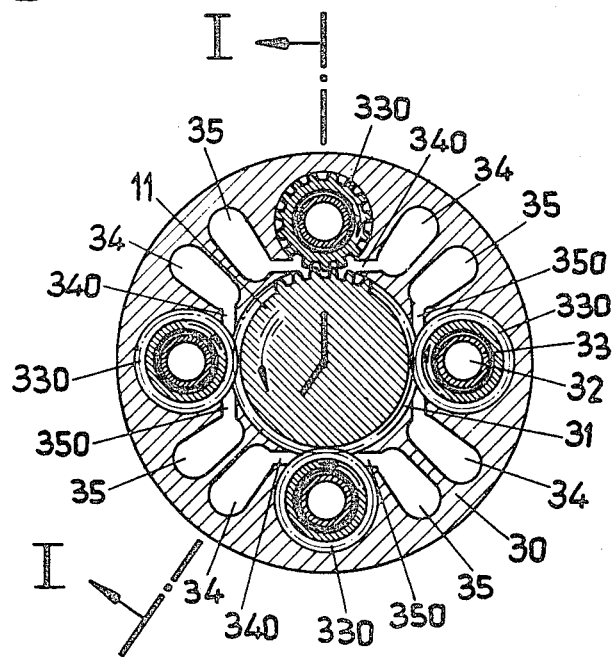

3,389,767
FLUID COUPLING
Jakob Burkart, 2 Allmendstr., 6048 Horw, Switzerland
Filed Dec. 15, 1966, Ser. No. 601,940
12 Claims. (Cl. 192—61)

ABSTRACT OF THE DISCLOSURE

Fluid coupling wherein a gear pump having meshing gears respectively carried by the input and output shafts circulates oil in a closed hydraulic circuit. The flow of oil is throttled if the input shaft is to transmit torque to the output shaft. Such throttling is effected by a regulating system including a first valve member which can be adjusted by hand to control the flow of oil to the suction side of the gear pump and by a second valve member which controls the flow of fluid from the pressure side of the pump and is responsive to changes in fluid pressure.

Background of the invention

The present invention relates to hydrostatic couplings in general, and more particularly to improvements in fluid couplings which may be utilized in automotive vehicles.

It is an important object of the invention to provide a fluid coupling whose output shaft can be driven at an infinite number of speeds while the speed of the input shaft remains constant.

Another object of the invention is to provide a compact fluid coupling which can react immediately to any and all changes in resistance offered to rotation of the output shaft.

A further object of the invention is to provide a fluid coupling which automatically finds a condition of equilibrium for each of a series of manually effected adjustments.

A concomitant object of the invention is to provide a novel regulating system for controlling the flow of hydraulic fluid in a coupling of the above outlined characteristics.

An ancillary object of the invention is to provide a fluid coupling which can be readily installed in many types of automotive vehicles, whose operation is automatic, and wherein the r.p.m. of the output shaft can be changed with minimal delay or without any appreciable delay.

Summary of the invention

One feature of the invention resides in the provision of a fluid coupling which comprises rotary input and output shafts, a pump including central gear means coaxially fixed to one of the shafts and rotary planet gear means meshing with the central gear means and carried by the other shaft, a closed fluid-filled hydraulic circuit having channel means for supplying and receiving fluid from the intermeshing teeth of the gear means whereby the fluid circulates in the circuit on rotation of the input shaft and the latter transmits torque to the output shaft in response to throttling of fluid flow, and regulating means for controlling the circulation of fluid in the closed circuit. The regulating means comprises a cylinder provided in the closed circuit and having first and second openings for entry and escape of circulating fluid, a first valve member having a first aperture and being displaceable to move its aperture into and from registry with one of the openings, and a second valve member installed adjacent to the path of circulating fluid and having a second aperture movable into and from registry with the other opening of the cylinder in response to changes in fluid pressure in the closed circuit.

The first valve member can be caused to move with reference to the cylinder in response to manual operation of an adjusting device, and this first valve member is preferably rotatable in the cylinder. The second valve member is preferably installed in the first valve member and is movable axially in response to changes in fluid pressure in the interior of the cylinder. A return spring biases the second valve member and opposes movements of the second valve member in response to increasing fluid pressure. The fluid pressure in the cylinder will rise if the first valve member is adjusted in a sense to reduce the flow of fluid through the first aperture and the corresponding opening. Such pressure rise will cause axial movement of the second valve member which then reduces the rate of fluid flow through the second aperture and the corresponding opening whereby the output shaft begins to rotate at a higher speed and the rotational speed of the planet gear means decreases to reduce the fluid pressure. This causes the aforementioned return spring to displace the second valve member and to increase the rate of fluid flow through the second aperture. The axial movement of the second valve member is terminated when the fluid coupling assumes a condition of equilibrium, there being a different condition of equilibrium for each position of the first valve member. The function of the first valve member is to select the r.p.m. of the output shaft at the will of the operator. The second valve member responds to changes in resistance offered to rotation of the output shaft.

The novel features which are considered as characteristic of the invention are set forth in particular in the appended claims. The improved fluid coupling itself, however, both as to its construction and its mode of operation, together with additional features and advantages thereof, will be best understood upon perusal of the following detailed description of certain specific embodiments with reference to the accompanying drawing.

Brief description of the drawing

FIG. 1 is an axial section through a fluid coupling which embodies the present invention, the section being taken in the direction of arrows from the line I—I of FIG. 2; and FIG. 2 is a transverse section through the pump as viewed in the direction of arrows from the line II—II of FIG. 1.

Description of the preferred embodiments

FIG. 1 illustrates a fluid coupling of the type adapted to be used in an automotive vehicle. This coupling comprises a housing G accommodating a rotary input shaft We which is driven by the engine, not shown. The housing G comprises a bearing bracket 10 for the hub 21 of a disk 20 which constitutes one end wall of a cylindrical planet gear carrier or rotor 30. The other end wall of the rotor 30 is constituted by a second disk 40. This rotor has an axial bore 31 (see also FIG. 2) whose axis coincides with the axis of the input shaft We and which accommodates a center gear 11 forming the driving member of a gear pump. The center gear 11 is integral with or is rigidly connected to the input shaft We.

The rotor 30 is further provided with four equidistant planet bores 32 accommodating hollow shafts 33. The ends of the hollow shafts 33 are connected with the disks 20 and 40. Each of these hollow shafts 33 is received in the axial bore of an elongated hollow planet gear 330 which constitutes the driven member of the gear pump and meshes with the center gear 11. Each planet gear 330 is freely rotatable on the respective shaft 33. The rotor 30 is also formed with four pairs of channels 34, 35 (see FIG. 2), one pair for each of the planet gears 330. Each channel 34 or 35 extends along the full length of the rotor 30 and communicates with elongated slots 340, 350 which respectively admit and receive hydraulic fluid from the regions where the teeth of the center gear 11 mesh with the teeth of the respective planet gears 330. The gear pump including the gears 11, 330 draws oil or another suitable hydraulic fluid from the channels 34 and forces such fluid into the channels 35. The rotor 30 and its channels form part of a closed hydraulic circuit for the fluid.

The disk 40 comprises a hollow cylindrical extension 41 (hereinafter called cylinder) whose internal space 411 registers with but is sealed from the bore 31 of the rotor 30. The right-hand end of the cylinder 41 carries a flange 410. The disk 40 further comprises a cupped cylindrical socket 42 which extends into the bore 110 of the center gear 11. The socket 42 is surrounded by a bearing sleeve for the center gear 11. The cylinder 41 is installed in the aforementioned closed circuit and its internal space 411 defines a portion of the path in which the fluid is circulated by the pump 11, 330.

The channels 34 of the rotor 30 register with apertures in the disk 40 and communicate with the interior of suction pipes 44 which are connected to or are integral with the disk 40. The right-hand ends of the suction pipes 44 communicate with the internal space 411 of the cylinder 41 through an opening 440 provided in the wall of the cylinder. The channels 35 communicate with another set of apertures in the disk 40 and with the interior of pressure pipes 45 which are connected to or integral with the disk 40 and communicate with the internal space 411 of the cylinder 41 through an opening 450. A second flange 50 is affixed to the flange 410 of the cylinder 41 by threaded fasteners 500 and serves as a bearing for cylindrical portions of shafts 51 whose axes are parallel to the axis of the input shaft We. The flange 50 seals the right-hand axial end of the internal space 411 in the cylinder 41 and is rigidly affixed to or forms an integral part of a rotary output shaft Wa. The latter carries a collar 61 which serves as a bearing for the right-hand ends of the shafts 51. The collar 61 is non-rotatably affixed to the output shaft Wa. Furthermore, and since the flange 50 is rigid with the flange 410, and since the flange 410 is rigid with the disk 40, the output shaft Wa is rigid with the rotor 30, i.e., it carries the planet gears 330.

The internal space 411 of the cylinder 41 accommodates a first valve member 46 which is an open-ended cylinder and is rotatably telescoped into the cylinder 41. The right-hand end of the valve member 46 is provided with a ring gear which meshes with pinions 510 mounted on the shafts 51. The shafts 51 carry a second set of pinions 520 which extend between the flange 50 and collar 61 and mesh with an internal gear 52 which is held against axial movement by a fixed guide 53. The pinions 520 have helical teeth of relatively large lead and can be rotated in response to angular displacement of the internal gear 52 about the axis of the output shaft Wa. In this way, the gear 52 changes the angular position of the valve member 46 through the intermediary of pinions 510. The parts 51-53, 510, 520 constitute an adjusting unit for the valve member 46.

The cylinder 41 is provided with the aforementioned openings 440, 450 and the valve member 46 is provided with two slit-shaped apertures 464, 465. The size of the aperture 464 equals the size of the opening 440. The aperture 465 extends in the circumferential direction of the cylinder 41 and its length at least equals the length of angular displacement of the valve member 46 in response to rotation of the internal gear 52. Thus, the aperture 465 is in continuous and full registry with the opening 450. The valve member 46 accommodates a second valve member here shown as a cupped piston 47 which is axially movably telescoped into the valve member 46 and whose open end faces the flange 50. The bottom wall of the piston 47 is biased by a helical return spring 470 which surrounds a guide pin 471. The purpose of the return spring 470 is to urge the pin 471 outwardly and away from the bottom wall of the piston 47. The head of the pin 471 is slidable in an axial bore of the socket 42. The piston 47 is adjacent to the path of circulating fluid and moves axially against the opposition of the spring 470 if the fluid pressure in the internal space 411 of the cylinder 41 increases.

The space between the bottom wall of the piston 47 and the disk 40 is connected with suction pipes 44 by one or more radial passages 478 so that such passages evacuate fluid which bleeds between the piston 47 and valve member 46 in a direction toward the disk 40. Thus, such leak fluid is returned to the suction side of the pump 11, 330.

The piston 47 has a circumferentially extending aperture 475 which is shown in full registry with the opening 450 and aperture 465 of the cylinder 41 and valve member 46. The parts 41, 46, 47 constitute a regulating system which controls the circulation of fluid in the closed hydraulic circuit.

The output shaft Wa is provided with a worm 62 which rotates a worm wheel 620 mounted on a shaft 621 serving to drive an auxiliary pump 622. The latter has an inlet which draws oil from a sump 623 in the housing G and an outlet which forces oil into a supply pipe 624 and thence into an annular bore 214 of the hub 21. The pump 622 conveys oil at a relatively low pressure. The bore 214 accommodates one-way valves 215 which can admit oil from the supply pipe 624 into axially parallel bores 216 of the disk 20. Such oil enters the suction channels 34 of the rotor 30. The valves 215 prevent return flow of oil from the suction channels 34 into the supply pipe 624. The parts 62, 620, 621 constitute a drive for the auxiliary pump 622, and this drive derives motion from the output shaft Wa. The sump 623 in the housing G accumulates oil which escapes from the closed hydraulic circuit, and the auxiliary pump 622 returns oil to the suction side of the pump 11, 330 so that the hydraulic circuit remains filled with oil. It is clear that the shaft 621 of the auxiliary pump 622 may derive motion from the input shaft We.

The bore 110 of the center gear 11 communicates with a smaller-diameter axial bore 111 extending through the remainder of the center gear 11 and also through the input shaft We. The bore 111 communicates with the interior of the housing G and permits escape of air when the interior of the rotor 30 is being pumped full with oil.

The operation is as follows:

The interior of the rotor 30 and the interior of all parts which communicate with the bores, channels and other cavities of the rotor is filled with a suitable hydraulic fluid, preferably oil. All such cavities, pipes, bores, channels and spaces constitute the aforementioned circuit and the cylinder 41 is installed in this circuit. The output shaft Wa is idle, i.e., the rotor 30 is also idle. The input shaft We is driven by a suitable motor, for example, by the engine of an automobile vehicle. The center gear 11 rotates with the input shaft We and drives the planet gears 330 which are rotated at a speed corresponding to the ratio of their diameters to the diameter of the center gear. The pump 11, 330 draws oil from the internal space 411 of the cylinder 41. Such oil flows through the aperture 464 and opening 440, suction pipes 44, channels 34 and slots 340. The intermeshing teeth of gears 11, 330 compel such oil to enter the slots 350 and to flow through pressure channels 35, opening 450, apertures 465, 475 and back into the internal space 411 of the cylinder 41. The apertures 464, 475 of valve members 46, 47 are in full registry with the openings 440, 450 of the cylinder 41; therefore, the throttling action of the regulating system is minimal and the output shaft receives no driving force, i.e., there is little or no resistance to rotation of the input shaft.

If the operator decides to change the angular position of the internal gear 52, the pinions 510 of the shafts 51 change the angular position of the valve member 46 to move the aperture 464 out of full registry with the opening 440 and to thereby throttle the flow of oil from the internal space 411 into the suction pipes 44 and on to the suction side of the gear pump. The gear 52 can be rotated to such an extent that the valve member 46 actually seals the internal space 411 from the suction pipes 44.

The channels 35 continue to admit a maximum amount of oil into the pressure pipes 45 and back into the internal space 411 whereby the oil pressure in the space 411 rises and the second valve member of piston 47 is caused to move axially in a direction to the left, as viewed in FIG. 1, against the opposition of the return spring 470 and moves its aperture 475 out of full registry with the opening 450 and aperture 465 to throttle the outflow of oil from the pipes 45 into the internal space 410. A portion of the driving torque of the input shaft We is then transmitted to the rotor 30 which in turn drives the output shaft Wa. If the output shaft Wa is free to rotate, i.e., if the driving torque transmitted to the rotor 30 suffices to overcome the forces which resist rotation of the output shaft Wa, the rotational speed of the planet gears 330 decreases because these gears then rotate about their own axes and simultaneously orbit about the center gear 11. Such reduction in rotational speed of the planet gears 330 reduces the pumping action and hence the pressure in the internal space 411 whereby the spring 470 expands (at least slightly) and shifts the piston 47 in a direction to the right to move a larger area of the slot 475 into registry with the opening 450 and aperture 465. This prevents transmission of excessive torque to the rotor 30 and output shaft Wa. The fluid coupling automatically finds a condition of equilibrium for each angular position of the valve member 46, and each such condition of equilibrium is established when the r.p.m. of planet gears 330 decreases by a predetermined extent below a maximum r.p.m. In other words, the rotational speed of the output shaft Wa first increases and thereupon decreases.

The improved fluid coupling may be used with advantage in automobiles to insure that the engine can operate at an enconomical speed, namely at a speed which guarantees that the input shaft We transmits a sufficient torque which results in maintenance of a maximum forward speed of the vehicle on good roads. When the valve member 46 actually seals the internal space 411 of the cylinder 41 from the suction pipes 44, the entire torque of the input shaft We can be transmitted to the output shaft Wa.

Another important advantage of the fluid coupling is that the forces for acceleration of the vehicle are immediately available at low forward speeds.

It will be seen that the engine of an automobile which embodies the above described fluid coupling must be dimensioned solely for operation under optimum conditions, i.e., any other than optimum conditions need not be considered at all. This results in substantial savings, not only as regards the manufacturing cost but also as regards the maintenance cost and the cost of operation.

The mounting of the central gear 11 and rotor 30 can be reversed, i.e., the rotor 30 can rotate with the input shaft if the central gear is fixed to the output shaft. The rotor then acts not unlike a flywheel which is of advantage when the input shaft is driven by an internal combustion engine.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. A fluid coupling, comprising rotary input and output shafts, a pump including central gear means coaxially fixed to one of said shafts and rotary planet gear means meshing with said central gear means and carried by the other shaft; a closed fluid-filled circuit having channel means for supplying and receiving fluid from the intermeshing teeth of said gear means whereby the fluid circulates in said circuit on rotation of said input shaft and the latter transmits torque to said output shaft in response to throttling of fluid flow; and regulating means for controlling the circulation of fluid in said circuit, comprising a cylinder provided in said circuit and having first and second openings for entry and escape of circulating fluid, a first valve member having a first aperture and being displaceable with reference to said cylinder to move its aperture into and from registry with one of said openings, and a second valve member installed adjacent to the path of circulating fluid and having a second aperture movable into and out of registry with the other opening of said cylinder in response to changes in fluid pressure in said circuit.

2. A fluid coupling as defined in claim 1, wherein said regulating means further comprises resilient means arranged to oppose movement of said second valve member in response to increasing fluid pressure in said circuit.

3. A fluid coupling as defined in claim 1, wherein said first valve member is rotatably received in said cylinder and further comprising adjusting means operable by hand to change the angular position of said first valve member and to thereby change the size of that portion of said first aperture which registers with said one opening.

4. A fluid coupling as defined in claim 3, wherein said output shaft comprises a portion affixed to and sealingly engaging one axial end of said cylinder, said adjusting means comprising a first gear provided on said first valve member, a second gear rotatably mounted in said portion of said output shaft and meshing with said first gear, and means for rotating said second gear to thereby change the angular position of said first valve member.

5. A fluid coupling as defined in claim 3, wherein said first valve member is an open-ended cylinder and said second valve member comprises a cupped piston which is axially movably telescoped into said first valve member.

6. A fluid coupling as defined in claim 5, wherein said cylinder has a substantially radially extending passage to collect fluid which happens to leak from said circuit between said valve members, said passage being connected to the suction side of said pump.

7. A fluid coupling as defined in claim 1, further comprising a housing arranged to collect leak fluid which happens to escape from said circuit, an auxiliary pump having an inlet receiving the thus collected leak fluid and an outlet for discharging fluid into said circuit, and drive means for operating said auxiliary pump, said drive means receiving motion from one of said shafts.

8. A fluid coupling as defined in claim 1, wherein said center gear means is affixed to said input shaft and said circuit includes rotor means affixed to said output shaft and constituting a carrier for said planet gear means.

9. A fluid coupling as defined in claim 1, wherein said cylinder is fixed to said output shaft and said first and second valve members are respectively received in said cylinder and in said first valve member.

10. A fluid coupling as defined in claim 1, wherein said circuit includes a rotor rotatably accommodating said planet gear means, said channel means being provided in said rotor.

11. A fluid coupling as defined in claim 1, wherein said first aperture is movable into and from registry with said second opening.

12. A fluid coupling as defined in claim 9, wherein said first valve member is provided with a further aperture which is in permanent registry with said other opening in each position of said first valve member.

References Cited
UNITED STATES PATENTS

| | | | |
|---|---|---|---|
| 2,396,149 | 3/1946 | Bock | 192—61 |
| 2,727,607 | 12/1955 | Colmerauer | 192—61 |

EDGAR W. GEOGHEGAN, *Primary Examiner.*